US010969339B2

(12) United States Patent
Santori et al.

(10) Patent No.: US 10,969,339 B2
(45) Date of Patent: Apr. 6, 2021

(54) OPTICAL READERS (71) Applicant: Hewlett-Packard Development Company, L.P., Spring, TX (US)

(72) Inventors: Charles M. Santori, Palo Alto, CA (US); James William Stasiak, Palo Alto, CA (US); Francesco Aieta, Palo Alto, CA (US); Anita Rogacs, San Diego, CA (US); Mineo Yamakawa, Palo Alto, CA (US); Kenneth Ward, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/838,662

(22) Filed: Apr. 2, 2020

(65) Prior Publication Data
US 2020/0232924 A1 Jul. 23, 2020

Related U.S. Application Data (63) Continuation of application No. 15/764,880, filed as application No. PCT/US2016/015719 on Jan. 29, 2016, now Pat. No. 10,620,126.

(51) Int. Cl.
*G01N 21/65* (2006.01)
(52) U.S. Cl.
CPC ... *G01N 21/658* (2013.01); *G01N 2201/0635* (2013.01)
(58) Field of Classification Search
CPC .................................................... G01N 21/658
USPC .......................................................... 356/301
See application file for complete search history.

(56) References Cited

U.S. PATENT DOCUMENTS

| 4,523,469 A | * | 6/1985 | Scott ................. G01N 29/2418 73/603 |
| 4,529,879 A | | 7/1985 | Schmit |
| 4,794,585 A | * | 12/1988 | Lee ...................... G11B 7/1353 369/112.12 |
| 6,174,677 B1 | | 1/2001 | Vo-Dinh |
| 6,677,565 B1 | | 1/2004 | Wahl et al. |
| 6,979,830 B2 | | 12/2005 | Dietz et al. |

(Continued)

FOREIGN PATENT DOCUMENTS

CN 1737515 2/2006
CN 101072996 11/2007
(Continued)

OTHER PUBLICATIONS

A. Bodkin et al., "Snapshot Hyperspectral Imaging—the Hyperpixel Array™ Camera", Proc. of SPIE vol. 7334, 73340H-1 (2009).

(Continued)

*Primary Examiner* — Tarifur R Chowdhury
*Assistant Examiner* — Omar H Nixon
(74) *Attorney, Agent, or Firm* — Hanley Flight & Zimmerman LLC (57) ABSTRACT

Optical readers are disclosed in examples herein. An example optical reader including a light source to emit a light beam; and a spot pattern generator to receive the light beam and to generate a two-dimensional spot array from the light beam, the two-dimensional spot array to be directed toward a substrate having nanostructures, the two-dimensional spot array to be sensed to detect a presence or an absence of a substance of interest on the substrate.

17 Claims, 9 Drawing Sheets

(56) References Cited

U.S. PATENT DOCUMENTS

| | | | | |
|---|---|---|---|---|
| 7,471,386 | B2* | 12/2008 | Neiss | G01J 3/02 356/300 |
| 2003/0016631 | A1 | 1/2003 | Piner et al. | |
| 2006/0001870 | A1 | 1/2006 | Voigt et al. | |
| 2006/0171428 | A1 | 8/2006 | Volodin | |
| 2006/0252065 | A1* | 11/2006 | Zhao | G01N 33/531 435/6.11 |
| 2007/0091266 | A1 | 4/2007 | Shaver | |
| 2007/0108284 | A1 | 5/2007 | Pankow et al. | |
| 2007/0146685 | A1 | 6/2007 | Yoo et al. | |
| 2007/0202022 | A1* | 8/2007 | Shin | F28F 9/0263 422/201 |
| 2007/0206185 | A1* | 9/2007 | Tuschel | G01J 3/44 356/301 |
| 2007/0252983 | A1 | 11/2007 | Tong et al. | |
| 2009/0218514 | A1 | 9/2009 | Klunder et al. | |
| 2012/0050732 | A1 | 3/2012 | Lu et al. | |
| 2012/0162642 | A1 | 6/2012 | Watson et al. | |
| 2013/0023435 | A1 | 1/2013 | Kho et al. | |
| 2014/0029003 | A1* | 1/2014 | Shih | G01J 3/0229 356/301 |
| 2014/0088884 | A1* | 3/2014 | Friedenberg | G01N 30/8686 702/22 |
| 2015/0122986 | A1 | 5/2015 | Haase | |
| 2016/0097774 | A1* | 4/2016 | Ashrafi | G01N 33/6896 73/61.43 |
| 2016/0202222 | A1 | 7/2016 | Roberts et al. | |
| 2016/0274539 | A1 | 9/2016 | Smithwick | |
| 2018/0321155 | A1 | 11/2018 | Santori et al. | |

FOREIGN PATENT DOCUMENTS

| | | |
|---|---|---|
| CN | 101793829 | 8/2010 |
| CN | 104280377 | 1/2015 |
| CN | 204142632 | 2/2015 |
| CN | 104422682 | 3/2015 |
| JP | 2001108684 | 4/2001 |
| JP | 2014010216 | 1/2014 |
| WO | 2006090308 | 8/2006 |

OTHER PUBLICATIONS

Qi, J. et al. "Sparse-sampling parallel Raman/SERS microspectroscopy by active illumination for high-throughput molecular analysis of micro and nanoparticles", retrieved on Mar. 2019.

Qi, Ji. et al., "High-speed Hyperspectral Raman Imaging for Label-free Compositional Microanalysis", Biomedical Optics Express, Oct. 8, 2013, vol. 4, No. 11: 5 pp.

Wang, Yunqing et al."SERS Tags: Novel Optical Nanoprobes for Bioanalysis", Chemical Reviews, vol. 113, No. 3, Dec. 28, 2812 (Dec. 28, 2812), pp. 1391-1428.

International Searching Authority, "Search report and Written Opinion," issued in connection with PCT patent application No. PCT/US2016/015719, dated Oct. 20, 2016, 10 pages.

International Bureau, "International Preliminary Report on Patentability," issued in connection with PCT patent application No. PCT/US2016/015719, dated Jul. 31, 2018, 9 pages.

United States Patent and Trademark Office, "Corrected Notice of Allowability," issued in connection with U.S. Appl. No. 15/764,880, dated Mar. 13, 2020, 12 pages.

United States Patent and Trademark Office, "Notice of Allowance," issued in connection with U.S. Appl. No. 15/764,880, dated Dec. 17, 2019, 15 pages.

United States Patent and Trademark Office, "Non-Final Office action," issued in connection with U.S. Appl. No. 15/764,880, dated Jul. 1, 2019, 17 pages.

\* cited by examiner

OPTICAL READERS

RELATED APPLICATIONS

This patent arises from a continuation of U.S. patent application Ser. No. 15/764,880, which was filed on Mar. 29, 2018, and which was the U.S. national stage of International Patent Application Serial No. PCT/US2016/015719, having an international filing date of Jan. 29, 2016. U.S. patent application Ser. No. 15/764,880 and International Patent Application Serial No. PCT/US2016/015719 are hereby incorporated by reference in their entireties for all purposes. Priority to U.S. patent application Ser. No. 15/764,880 and International Patent Application Serial No. PCT/US2016/015719 is claimed.

BACKGROUND

Surface Enhanced Raman Scattering (SERS) may be used in various industries to detect the presence of an analyte. For example, SERS may be used in the security industry to detect and/or scan for explosives (e.g., detecting and/or scanning baggage at airports for explosives and/or other hazardous materials). In another example, SERS may be used in the food industry to detect toxins or contaminates in foods or drinks.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Examples disclosed herein provide optical readers and/or devices that may be used to detect the presence of substance(s) of interest on a substrate by generating a spot array on the substrate and collecting spectroscopic data therefrom. In some examples, the substance(s) of interest may be associated with the presence of explosives, toxins or hazardous substances at airports, manufacturing facilities, food processing facilities, drug preparation plants, medical screening processes, etc.

In some examples, by generating a spot array that is reflected off of the substrate and collecting the spectroscopic data from the respective locations on the substrate, parallel readings of different locations on the substrate may be obtained in real-time. Thus, using examples disclosed herein, data from multiple locations on a substrate may be collected substantially simultaneously, thereby increasing the rate at which the substrate is analyzed and/or reducing the amount of time to conduct a thorough analysis of the substrate. Such simultaneous multi-location data collection may increase the likelihood of detecting a substance(s) of interest and/or deter the substance(s) of interest from decomposing or becoming unrecognizable due to a time delay in sampling and/or analysis.

Some examples employ Raman spectrometers that generate a laser spot array on a surface of the substrate. The spot array is reflected from the substrate to a sensor (e.g., a two-dimensional (2D) sensor). The sensor collects spectroscopic data (e.g., via a process called surface enhanced Raman scattering (SERS)). In some examples, the laser spot array is generated by passing a single light beam (e.g., a laser beam) through an example spot pattern generator. The spot pattern generator may be implemented as a holographic spot pattern generator (e.g., a holographic plate), a spatial light modulator, a digital micro mirror device, a metallic holographic mask, etc. In some examples, the holographic spot pattern generator contains a superposition (e.g., a nonlinear superposition) of diffraction gratings having different spatial frequencies that convert a single light beam generated by a light source (e.g., a laser) into a superposition of multiple light beams. In some examples, the holographic spot pattern generator includes two orthogonal gratings having regular intervals (e.g., specific periodicities). The multiple light beams travel at different angles toward an objective lens that focuses the light beams to the substrate at different locations.

In some examples, to focus (e.g., tightly focus) the spot array on the substrate, the example optical readers include an example actuator (e.g., a voice coil actuator) that adjusts (e.g., moves and/or flexes) the objective lens relative to the substrate. In some examples, the optical reader adjusts the objective lens, via the actuator, to increase an intensity of the light received at the sensor and/or to enable the intensity of the light received at the sensor to meet a threshold intensity. In some examples, the example optical reader uses a feedback loop that compares the intensity of the received light to a reference light intensity and adjusts the objective lens, via the actuator, based on the comparison to increase the intensity. This example feedback loop may iterate until a threshold intensity is achieved. In some examples, the reflected spot array is passed through a beamsplitter, filtered to reduce laser light and separated by a diffraction grating prior to being collected at the sensor.

In some examples, the dispersion caused by the diffraction grating enables each spot of the spot array to be collected as a band of light or a column of light at the sensor. In some examples, different horizontal coordinates along the band of light correspond to different frequencies. Thus, for each spot of the spot array, a full spectrum is obtained. In some examples, to increase an area of the sensor utilized while deterring adjacent bands of light from overlapping or being too far part, an angle (e.g., an orientation angle) of the spot array relative to the diffraction grating is selected to be about 15 degrees. However, in other examples, the angle of the spot array relative to the diffraction grating may be any other suitable angle (e.g., 14-degrees, 16-degrees, 17-degrees, 20-degrees, 25-degrees, etc.) to obtain a desired result.

In some examples, the example optical readers disclosed herein perform a parallel detection process which enables different substances of interest to be deposited on a single substrate and detected substantially simultaneously and/or in real-time. As used herein, the phrase "substantially simultaneously" refers to a negligible time difference (e.g., less than 2 seconds) between the detection of the different substances of interest. In some such examples, an example pipetting system may be used to deposit an array of different substances of interest onto a single substrate for detection using the example optical reader. In some examples, to detect different substances of interest, the example substrates include spatially varying patterns (e.g., different topography) where, for example, a first portion of the substrate has a first arrangement of nanostructures (e.g., a pentamer arrangement) to which a first substance of interest (e.g., a first analyte) may be attracted and a second portion of the substrate has a second arrangement of nanostructures (e.g., a trimer arrangement) to which a second substance of interest (e.g., a second analyte) may be attracted. However, different substrates may have more nanostructure arrangements (e.g., 3, 4, 5, etc. nanostructure arrangements) or less nanostructure arrangements (e.g., 1 nanostructure arrangement).

In some examples, the nanostructures are at least partially transparent. In some examples, the nanostructures include pillars and/or conical structures on which nanoparticles are deposited. In some examples, the nanoparticles may include gold and/or silver and/or any other element or chemical that may react with, respond to, collect, etc., a substance of interest such as an analyte. In some examples, after exposure to a substance or chemical, the nanostructures are pulled together to form nanoparticle assemblies having controllable geometries for enhanced spectroscopic analysis.

While above examples mention using optical readers in connection with SERS spectroscopy, example optical readers disclosed herein may be used to perform other types of spectroscopy. For example, example optical readers may be used in connection with fluorescence spectroscopy and/or infrared spectroscopy. In some such examples, the diffraction grating used in connection with SERS spectroscopy may be replaced with a prism (e.g., if high spectral resolution is not desired).

Figure 1:
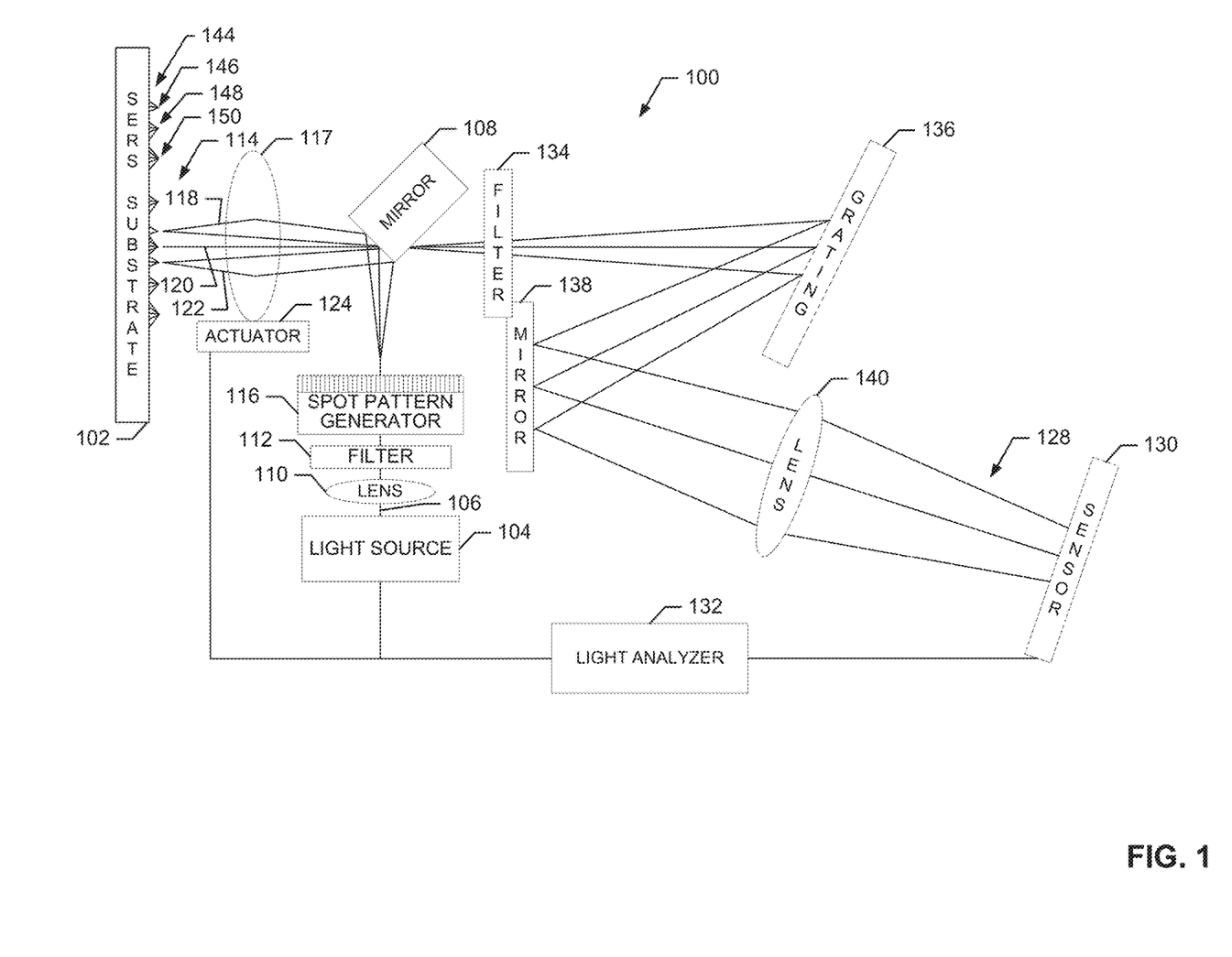
FIG. 1 is a schematic illustration of an example optical reader constructed in accordance with the teachings of this disclosure to obtain parallelized readings from a substrate.

FIG. 1 is a block diagram of an example optical reader 100 constructed in accordance with the teachings of this disclosure to analyze an example substrate 102. The example optical reader 100 of this example may implement a Raman spectrometer, a fluorescence spectrometer, an infrared spectrometer, etc. In the illustrated example, to excite the example substrate 102 that may have been exposed to a substance of interest (e.g., an analyte), the optical reader 100 includes an example light source 104. The example light source 104 may be implemented as a laser diode or other excitation source that emits an example light beam 106 (e.g., a light amplification by stimulated emission of radiation (a laser)).

In the illustrated example, the laser beam 106 is directed toward an example beam splitter (e.g., a broadband beam splitter) 108 or a mirror (e.g., dichroic mirror). However, prior to the light beam 106 reaching the beam splitter 108, the light beam 106 is collimated using a first example lens 110 and is filtered using a first example filter 112. The first lens 110 may be implemented by a collimating lens and the first filter 112 may be implemented by a laser cleanup filter that filters some emissions (e.g., unwanted emissions) from the light source 104. In the illustrated example, to generate an example spot array 114 from the single light beam 106, the optical reader 100 includes an example spot pattern generator 116. In some examples, the spot pattern generator 116 does not include moving parts. In some examples, the spot pattern generator 116 is a holographic optical element (e.g., an optical plate, a holographic plate, etc.) that contains a superposition (e.g., nonlinear superposition) of diffraction gratings that convert (e.g., diffract) the light beam 106 into the spot array 114. In other examples, the spot pattern generator 116 is an example spatial light modulator, an example digital micro mirror device and/or an example diffraction amplitude mask.

The example spot array 114 includes a plurality of separate light beams. These separate light beams reflect off of the beam splitter 108, pass through a second lens 117 and illuminate different positions on the example substrate 102. The second lens 117 may be implemented by an objective lens. In the illustrated example, the separate light beams of the spot array 114 include a first light beam 118 (e.g., a laser beam), a second light beam 120 (e.g., a laser beam) and a third light beam 122 (e.g., a laser beam). However, the example spot pattern generator 116 may create a spot array including any number of light beams (e.g., 16, 25, 36, 39, etc.).

As shown in the example of FIG. 1, to focus the spot array 114 on the substrate 102, the example optical reader 100 includes an example actuator 124 that is coupled to the second lens 117. The actuator 124 may be implemented by a voice coil actuator or any other suitable device to move the second lens 117. In some examples, to form the spot array 114 on the substrate 102, the position of the second lens 117, the beam splitter 108 and/or another structure is adjusted by moving the second lens 117 along an x-axis, a y-axis, a z-axis. In other words, in some examples, the second lens 117 is moved closer to the substrate 102, is moved farther from the substrate 102, is moved laterally relative to the substrate 102, etc. In other examples, the second lens 117 is flexed or otherwise adjusted.

In some examples, the actuator 124 is controlled based on a feedback loop that ensures a reflected spot array 128 exhibits a threshold intensity at a sensor 130. To this end, the optical reader 100 includes an example light analyzer 132 that compares a light intensity measured by the sensor 130 to a reference light intensity to determine if the measured light intensity is within a threshold of the reference light intensity. The sensor 130 may be implemented by a two-dimensional (2D) sensor. In some examples, if the measured light intensity is outside of the threshold, the light analyzer 132 iteratively causes the actuator 124 to move the objective lens 117 until the measured light intensity is within the threshold of the reference light intensity. In other words, in some examples, the light analyzer 132 of the example optical reader 100 of FIG. 1 executes an autofocus process to enable the spot array 114 at the substrate 102 and the reflected spot array 128 at the sensor 130 to be within a threshold intensity of a reference light intensity. The reference intensity is an intensity sufficient to detect the substance(s) of interest for the given application (e.g., between about 10 and 1000 photons per second).

In the illustrated example, the example spot array 128 reflects from the substrate 102 and passes through a second filter 134 toward an example diffraction grating 136. The second filter 134 may be implemented as a laser blocking filter that reduces the laser light contained in the reflected spot array 128. In the illustrated example, the diffraction grating 136 disperses the reflected spot array 128 toward an example mirror 138 that reflects the reflected spot array 128 through a third example lens 140 to the sensor 130. The third lens 140 may be a collimating lens. In some examples, the diffraction grating 136 disperses the reflected spot array 128 to enable each spot of the reflected spot array 128 to be collected as a band of light by the sensor 130. In some examples, each band of light includes a frequency spectrum, a band of frequencies and/or is associated with measurements at different frequencies.

In the illustrated example, the sensor 130 converts the reflected spot array 128 into spectroscopic data. The light analyzer 132 of the illustrated example associates the spectroscopic data for respective spots of the reflected spot array 128 with corresponding locations of nanostructures 144 on the substrate 102 such as, for example, a first arrangement 146 of the nanostructures 144, a second arrangement 148 of the nanostructures 144 or a third arrangement 150 of the nanostructures 144.

In some examples, to attempt to detect a first substance of interest at the first arrangement 146 of the nanostructures 144, the light analyzer 132 compares the corresponding spectroscopic data to reference data by comparing the frequency of the reflected light to known frequency compositions for light reflected from known substances of interest. In some examples, to attempt to detect the first substance of interest and/or a second substance of interest at the second arrangement 148 of the nanostructures 144, the light analyzer 132 compares the corresponding spectroscopic data to reference data by comparing the frequency of the reflected light to known frequency compositions for light reflected from known substances of interest. In some examples, to attempt to detect the first substance of interest and/or a second substance of interest at the third arrangement 150 of the nanostructures 144, the light analyzer 132 compares the corresponding spectroscopic data to reference data by comparing the frequency of the reflected light to known frequency compositions for light reflected from known substances of interest. The example light analyzer 132 generates results regarding the presence or absence of the substance(s) of interest on the substrate 102 and/or at the different locations on the substrate 102 and presents the results using the light analyzer 132.

Figure 2:
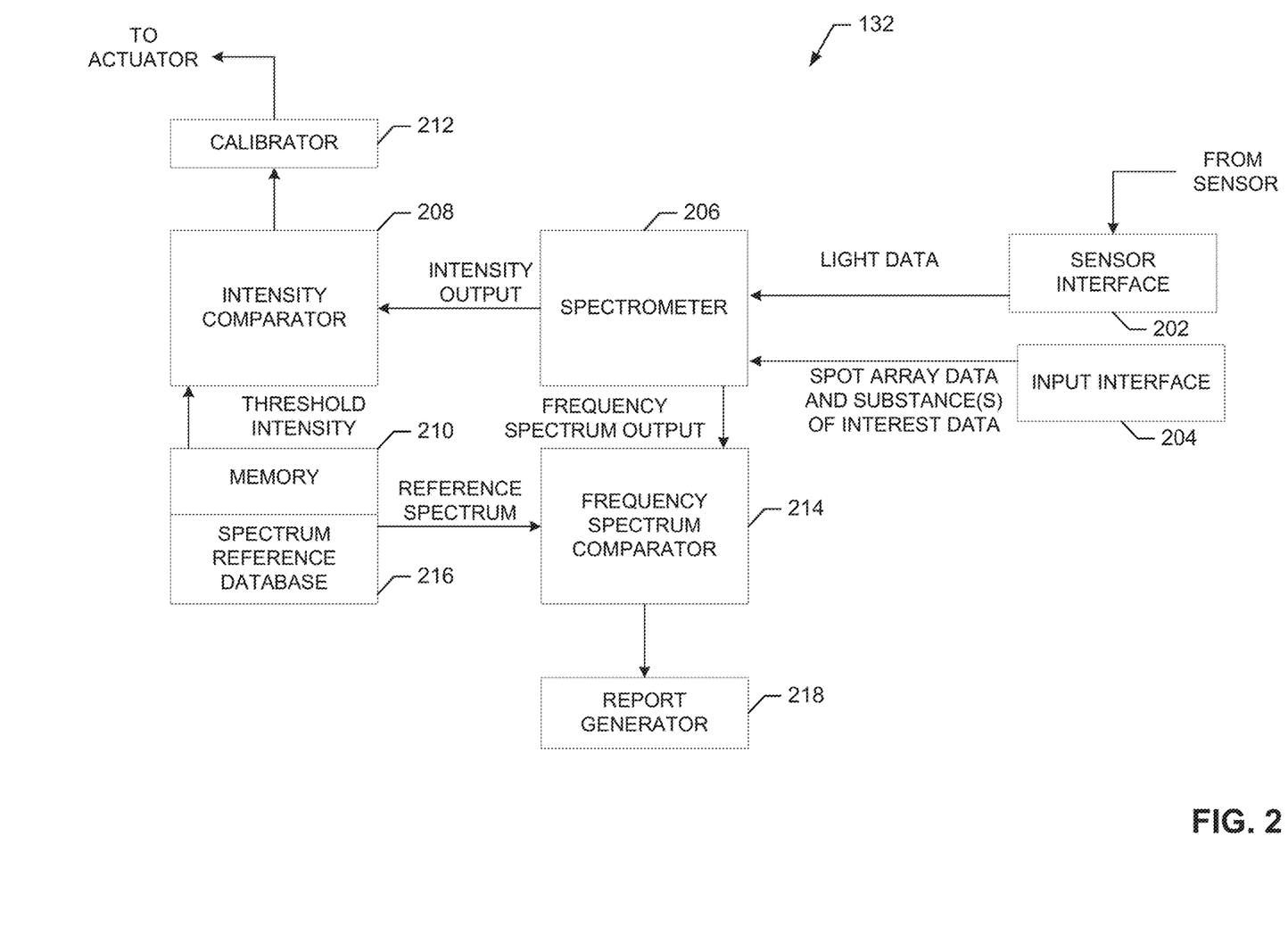
FIG. 2 is a block diagram of an example implementation of the example light analyzer of FIG. 1.

FIG. 2 is a block diagram illustrating an example light analyzer 132 that can be used to implement the light analyzer 132 of FIG. 1. The example light analyzer 132 of FIG. 2 includes an example sensor interface 202, an example input interface 204, an example spectrometer 206, an example intensity comparator 208, an example memory 210, an example calibrator 212, an example frequency spectrum comparator 214, an example spectrum reference database 216 and an example report generator 218.

In the illustrated example, the light analyzer 132 includes the example sensor interface 202 that receives data from the sensor 130 and the input interface 204 that receives input from an operator. In some examples, the data received by the sensor interface 202 includes spectroscopic data and the input received by the input interface 204 includes the location of the nanostructure arrangements 144, 146, 148 on the substrate 102, the pattern of the spot array 114 and/or the substance of interest data such as, for example, the names of a substance(s) of interest suspected to be present on the substrate 102.

In the illustrated example, the light analyzer 132 includes the spectrometer 206 that receives light data from the sensor interface 202 and spot array data and substance(s) of interest data from the input interface 204. In some examples, the spectrometer 206 uses the light data to determine spectroscopic data including a frequency spectrum for each of the spots of the spot array 114. In some examples, the spectrometer 206 uses the light data to determine an intensity of the light received at the sensor 130.

In the illustrated example, to ensure the intensity of the reflected spot array 128 falls within a threshold of a reference light intensity, the light analyzer 132 includes the example intensity comparator 208 that obtains a measured light intensity value from the spectrometer 206 and compares the measured light intensity value to a reference light intensity value obtained from the memory 210 to determine a difference. In the illustrated example, the light analyzer 132 includes the calibrator 212 that obtains the comparison data and/or an input indicative of the difference between the measured and reference light intensities from the intensity comparator 208 and determines an amount (e.g., a distance, an angle, etc.) that the actuator 126 should adjust the second lens 117, the beam splitter 108 and/or any other structure to enable the next measured light intensity value to match the reference light intensity value within a threshold (e.g., between about 10 and 1000 photons per second).

The example frequency spectrum comparator 214 obtains the frequency spectrum output from the spectrometer 206 and compares the frequency spectrum output to a reference spectrum obtained from the spectrum reference database 216 stored in the example memory 210. In some examples, the reference data includes known frequency compositions for light reflected from known substances of interest. In the illustrated example, the light analyzer 132 includes the report generator 218 to generate results relating to the presence or the absence of a substance(s) of interest at the different locations on the substrate 102.

While an example manner of implementing the light analyzer 132 of FIG. 1 is illustrated in FIG. 2, at least one of the elements, processes and/or devices illustrated in FIG. 2 may be combined, divided, re-arranged, omitted, eliminated and/or implemented in any other way. Further, the sensor interface 202, the input interface 204, the spectrometer 206, the intensity comparator 208, the memory 210, the calibrator 212, the frequency spectrum comparator 214, the spectrum reference database 216, the report generator 218 and/or, more generally, the example light analyzer of FIG. 2 may be implemented by hardware, software, firmware and/or any combination of hardware, software and/or firmware. Thus, for example, any of the example the sensor interface 202, the input interface 204, the spectrometer 206, the intensity comparator 208, the memory 210, the calibrator 212, the frequency spectrum comparator 214, the spectrum reference database 216, the report generator 218 and/or, more generally, the example light analyzer of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the sensor interface 202, the input interface 204, the spectrometer 206, the intensity comparator 208, the memory 210, the calibrator 212, the frequency spectrum comparator 214, the spectrum reference database 216, the report generator 218 and/or, more generally, the example light analyzer of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example light analyzer 132 of FIG. 1 may include one or more elements, processes and/or devices in addition to, or instead of, those illustrated in FIG. 2, and/or may include more than one of any or all of the illustrated elements, processes and devices.

Figure 3:
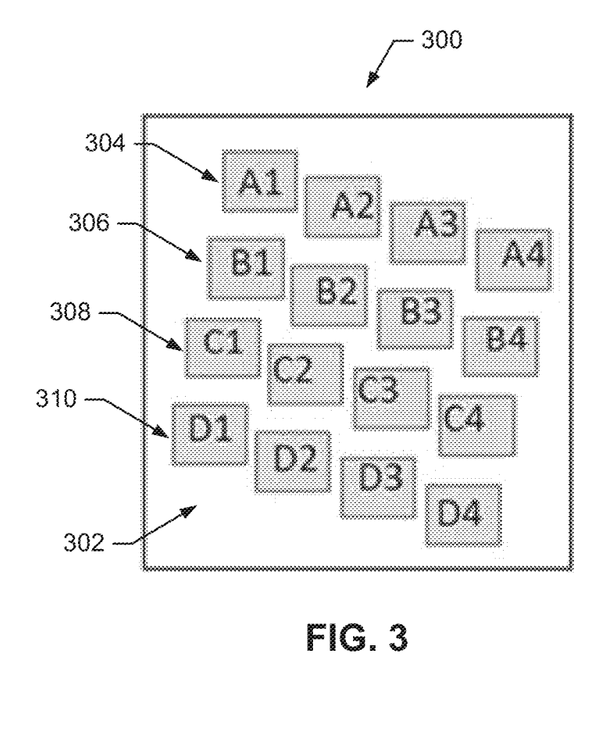
FIG. 3 is a schematic illustration of an example substrate that may be analyzed in the example optical reader of FIG. 1.

FIG. 3 is a schematic illustration of an example substrate 300 that may be analyzed in the example optical reader of FIG. 1. In the illustrated example, the substrate 300 includes sixteen locations having nanostructures 302 including first arrangements 304 of nanostructures 302 denoted by A1, A2, A3 and A4, second arrangements 306 of nanostructures 302 denoted by B1, B2, B3 and B4, third arrangements 308 of nanostructures 302 denoted by C1, C2, C3 and C4 and fourth arrangements 310 of nanostructures 302 denoted by D1, D2, D3 and D4. However, in other examples, the substrate 300 may include less than sixteen nanostructure locations (e.g., 4, 5, 9, etc.) or more sixteen nanostructure locations (e.g., 25, 29, 36, 49).

Figure 4:
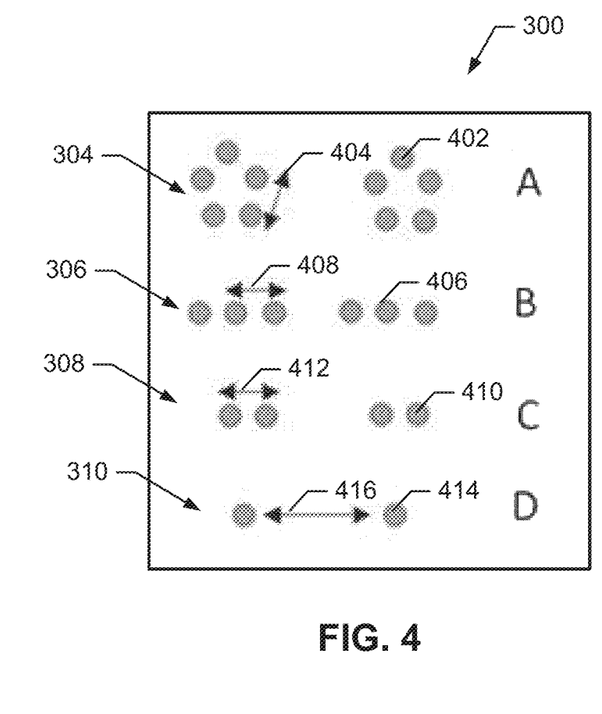
FIG. 4 is a schematic illustration of example nanostructures that may be disposed on the example substrate of FIG. 3.

FIG. 4 is a schematic illustration of example nanostructures that may be disposed on the example substrate of FIG. 3. As shown in the illustrated example of FIG. 4, each of the first arrangements 304 of nanostructures 302 are configured as a pentamer arrangement 402 of nanostructures 302 where the nanostructures 302 are spaced from one another a first distance 404. In the illustrated example, each of the second arrangements 306 of nanostructures 302 are configured as a trimer arrangement 406 of nanostructures 302 where the nanostructures 302 are spaced from one another a second distance 408. In the illustrated example, each of the third arrangements 308 of nanostructures 302 are configured as a dimer arrangement 410 of nanostructures 302 where the nanostructures 302 are spaced from one another a third distance 412. In the illustrated example, each of the fourth arrangements 414 of nanostructures 302 are configured as a monomer arrangement 414 of nanostructures 302 where the nanostructures 302 are spaced from one another a fourth distance 416.

Figure 5:
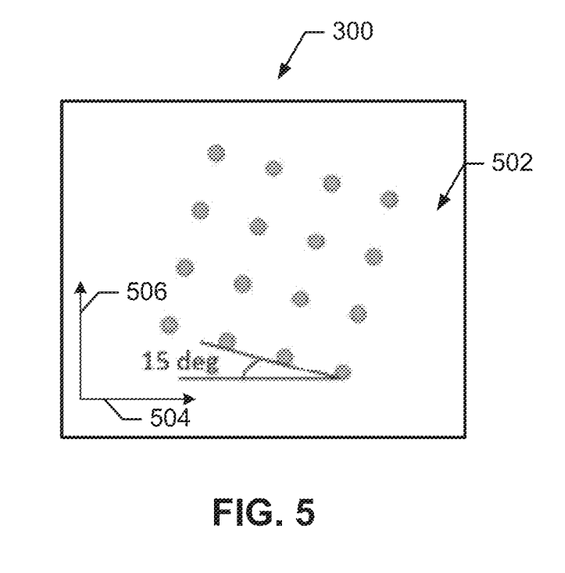
FIG. 5 is a schematic illustration of an example spot array that can be generated on an example substrate using the example optical reader of FIG. 1.

FIG. 5 illustrates an example spot array 502 on the example substrate 300. The example spot array 502 is formed by the example spot pattern generator 116 of FIG. 1. In the illustrated example, the spot array 502 is a two-dimensional spot array having spots along a first axis 504 (e.g., an x-axis) and along a second axis 506 (e.g., a y-axis). In this example, the spots of the spot array 502 correspond to respective ones of the nanostructure arrangements 304, 206, 308, 310. In other words, the spots of the spot array 502 are directed onto the nanostructure arrangements 304, 306, 308, 310. In some examples, to increase an area of the sensor 130 utilized while deterring adjacent bands of light from overlapping or being too far part, an angle (e.g., an orientation angle) of the spot array 502 relative to the diffraction grating 136 is selected to be substantially 15 degrees. However, in other examples, the angle of the spot array 502 relative to the diffraction grating 136 may be any other suitable angle (e.g., 14-degrees, 16-degrees, 17-degrees, etc.) to obtain a desired result.

Figure 6:
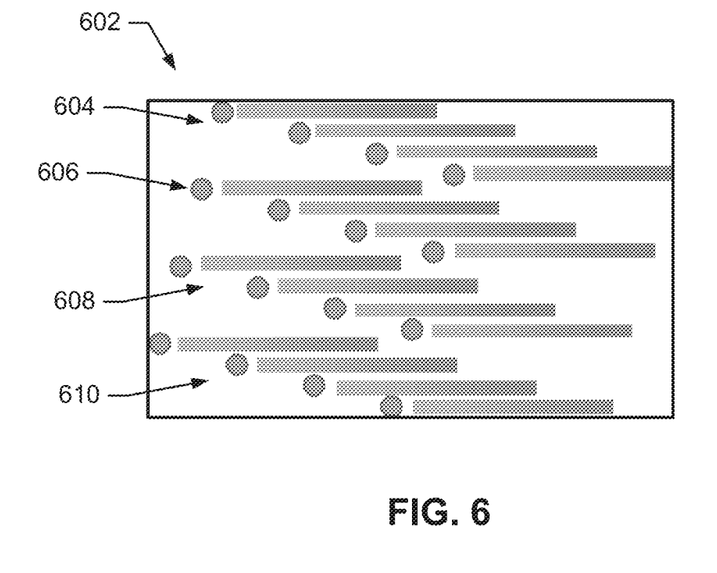
FIG. 6 illustrates example measurement results obtained using the examples disclosed herein.

FIG. 6 illustrates example bands of light 602 collected at the sensor 130. In the illustrated example, the bands of light 602 in a first row 604 correspond to respective ones of the first arrangements 304 of the nanostructures 302, the bands of light 602 in a second row 606 correspond to respective ones of the second arrangements 306 of the nanostructures 302, the bands of light 602 in a third row 608 correspond to respective ones of the third arrangements 308 of the nanostructures 302 and the bands of light 602 in a fourth row 610 correspond to respective ones of the fourth arrangements 310 of the nanostructures 302.

Figure 7:
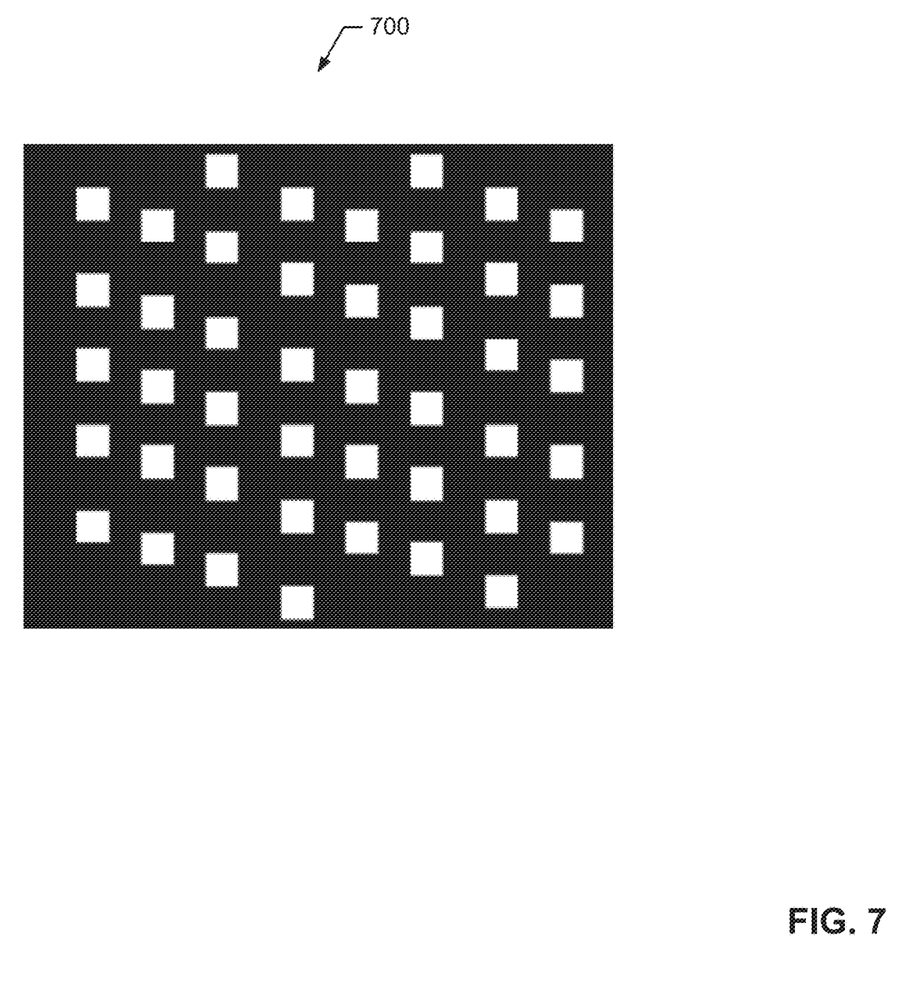
FIG. 7 is an example diffractive amplitude mask that can be used to implement the example spot pattern generator of FIG. 1.

FIG. 7 illustrates an example diffractive amplitude mask 700 (e.g., a holographic plate) that can be used to implement the example spot pattern generator 116 of FIG. 1. In some examples, the amplitude mask 700 generates the spot array 114 using a superposition of two orthogonal gratings with specific periodicities.

Figure 8:
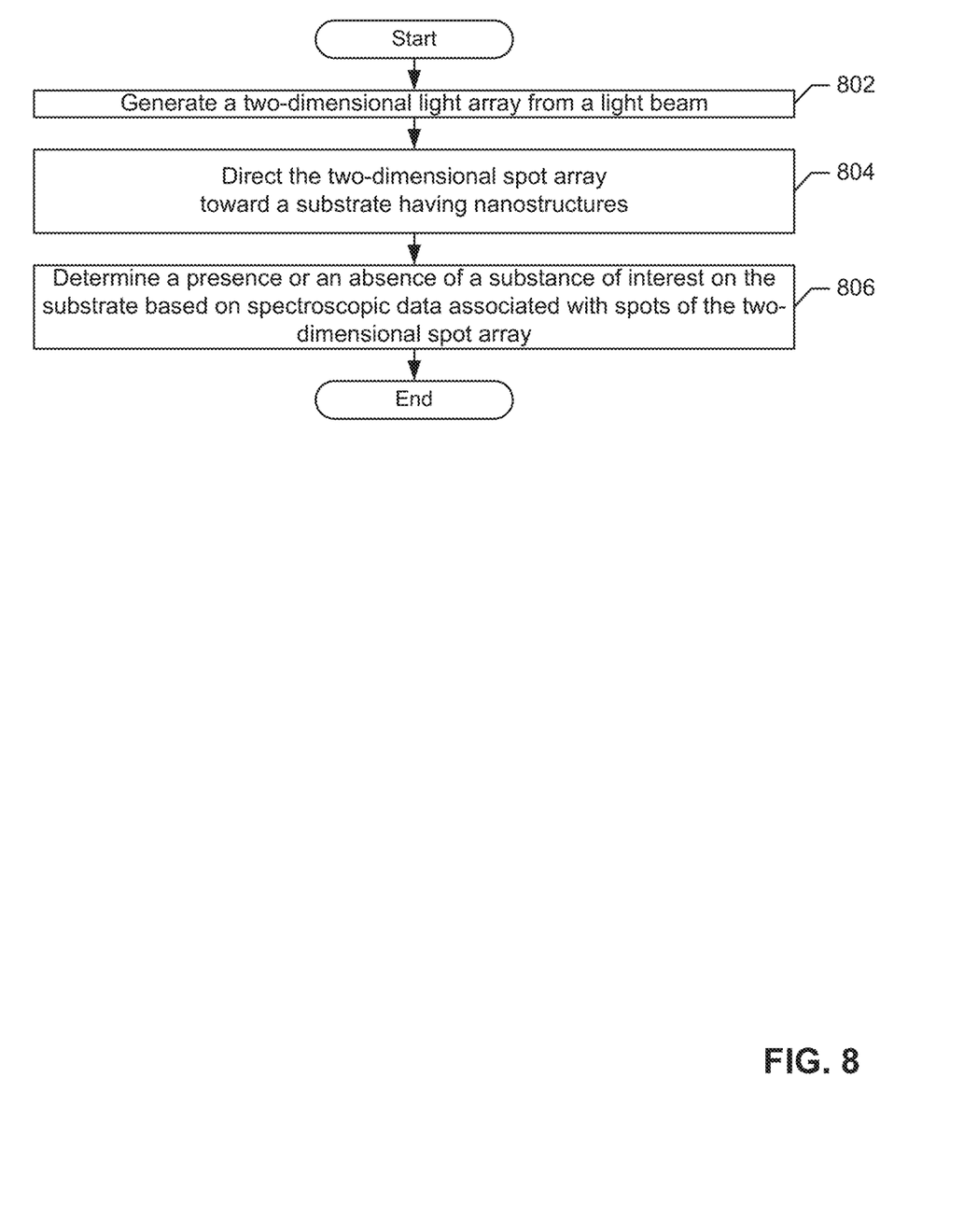
FIG. 8 is an example flow chart representative of example processes that may be performed in the operation of the example optical reader of FIG. 1.

FIG. 8 is a flowchart illustrating example processes performed during the operation of the example optical reader 100 of FIG. 1. The process of FIG. 8 begins by generating a two-dimensional spot array from a light beam (block 802) by, for example, the spot pattern generator 124 receiving the light beam 106 and the converting the light beam 106 into the spot array 114. The two-dimensional spot array is directed toward a substrate having nanostructures (block 804) by, for example, the beam splitter 108 receiving the spot array 114 from the spot pattern generator 116 and directing the spot array 114 toward the substrate 102. In some examples, spots of the spot array 114 are aligned with corresponding ones of the arrangements 146, 148, 150 of nanostructures 144 and/or locations on the substrate 102. A presence or an absence of a substance of interest on the substrate is determined based on the spectroscopic data associated with spots of the two-dimensional spot array (block 806) by, for example, the frequency spectrum comparator 214 of the light analyzer 132 comparing the spectroscopic data of one of the spots of the reflected spot array 128 to reference data and determining a presence or absence of a substance of interest based on the comparison.

Figure 9:
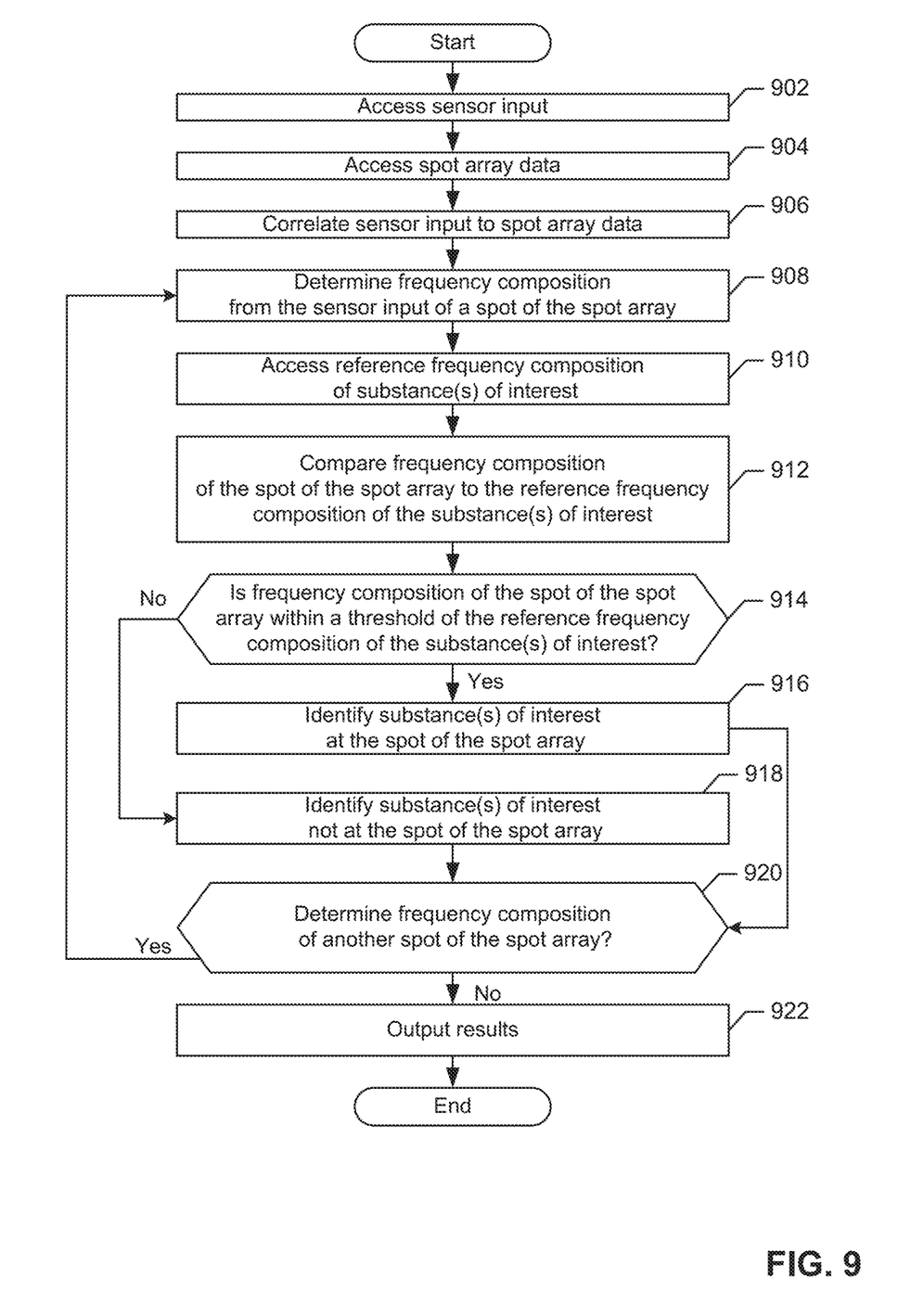
FIG. 9 is an example flowchart representative of example machine readable instructions that may be executed to implement the example light analyzer of FIGS. 1 and/or 2.
Figure 10:
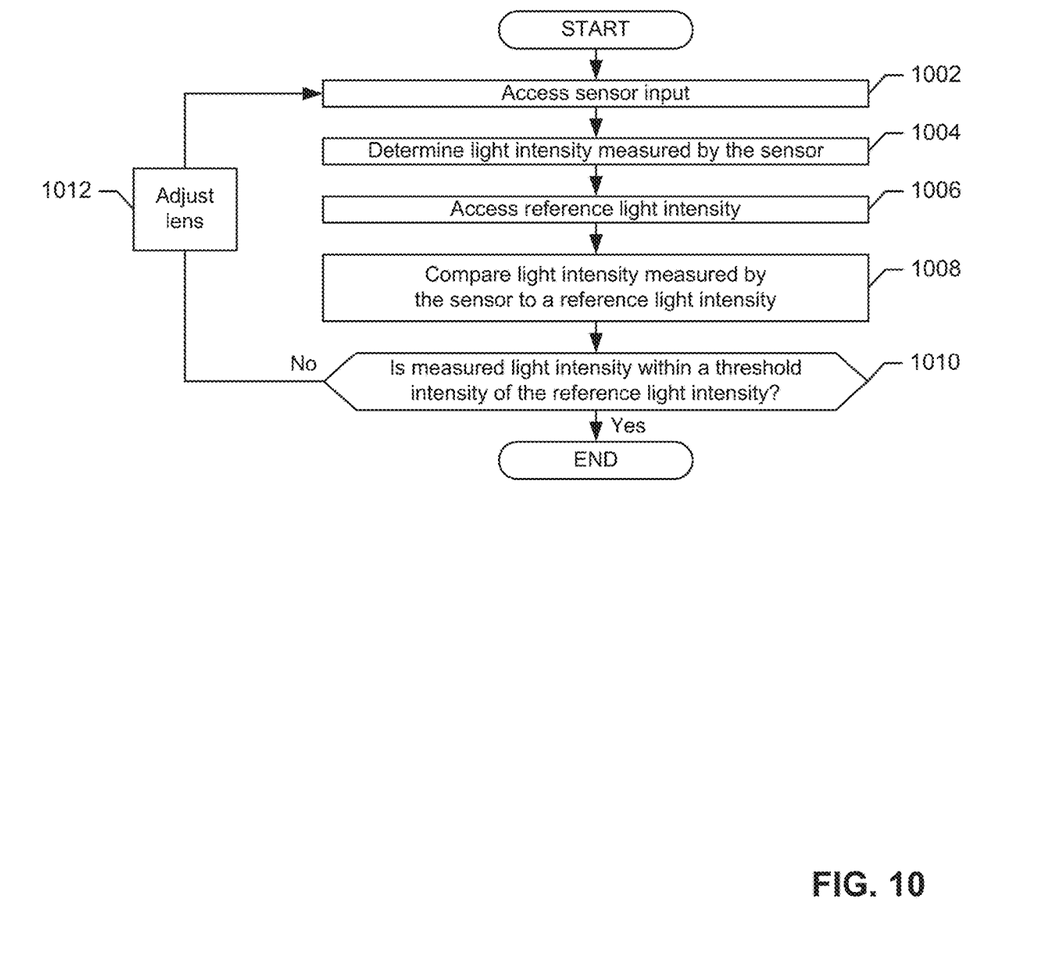
FIG. 10 is an example flowchart representative of example machine readable instructions that may be executed to the implement the example light analyzer of FIGS. 1 and/or 2.

Flowcharts representative of example machine readable instructions for implementing the light analyzer 1132 of FIGS. 1 and/or 2 are shown in FIGS. 9 and 10. In this example, the machine readable instructions comprise a program for execution by a processor such as the light analyzer 132 of FIGS. 1 and/or 2 and/or the processor 1112 shown in the example processor platform 1100 discussed below in connection with FIG. 11. The program may be included in software stored on a tangible computer readable storage medium such as a CD-ROM, a floppy disk, a hard drive, a digital versatile disk (DVD), a Blu-ray disk, or a memory associated with the light analyzer 132 and/or the processor 1112, but the entire program and/or parts thereof could alternatively be executed by a device other than the light analyzer 132 and/or the processor 1112 and/or included in and/or implemented by firmware or dedicated hardware. Further, although the example program(s) is described with reference to the flowcharts illustrated in FIGS. 9 and 10, many other methods of implementing the example light analyzer 132 of FIGS. 1 and/or 2 may alternatively be used. For example, the order of execution of the blocks may be changed, and/or some of the blocks described may be changed, eliminated, or combined.

As mentioned above, the example processes of FIGS. 9 and 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 9 and 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

The program of FIG. 9 begins by accessing data associated with a sensor input (block 902) by, for example, the sensor interface 202 obtaining sensor data from the sensor 130. Data associated with the spot array is accessed (block 904) by, for example, the input interface 204 receiving data from an operator identifying the number of spots of the spot array 114, the pattern of the spot array, etc. In some examples, each spot of the spot array 114 corresponds to a different location on the substrate 102. The sensor input is correlated to the spot array data (block 906) by, for example, the spectrometer 206 associating the spectroscopic data from the sensor 130 to corresponding beams of the reflected light array 128 and/or to corresponding locations on the substrate 102, 300. For example, the spectrometer 206 may correlate the spectrometer data, the spot array 114 and the locations on the substrate 102 including, for example, the first arrangement 146, 304 of the nanostructures 144, the second arrangement 148, 206 of the nanostructures 144, the third arrangement 150, 308 of the nanostructures 144 and the fourth arrangement 310 of nanostructures 144.

A frequency composition is determined from the sensor input of a spot of the spot array (block 908) by, for example, the spectrometer 206 using the light data to determine a frequency spectrum for a spot of the spot array 114, 128. A reference frequency composition of a substance(s) of interest in accessed (block 910) by, for example, the spectrometer 206 obtaining data from the spectrum reference database 216 of the memory 210 relating to the substance of interest identified by the input interface 204. The frequency composition of the spot of the spot array is compared to the reference frequency composition of the substance of interest (block 912) by, for example, the frequency spectrum comparator 214 comparing the frequency composition of the spot of the spot array to the reference frequency of the substance of interest to determine a difference.

The program of FIG. 9 then determines if the frequency composition of the spot of the spot array is within a threshold of the reference frequency composition of the substance(s) of interest (block 914) by, for example, the frequency spectrum comparator 214 comparing the determined difference to the threshold. If the frequency composition of the spot of the spot array is within the threshold of the reference frequency composition, the substance(s) of interest is identified as being present at the spot of the spot array (block 916) by, for example, the frequency spectrum comparator 214 associating the spot of the spot array with the presence of the substance(s) of interest. However, if the frequency composition of the spot of the spot array is outside of the threshold of the reference frequency composition, the substance(s) of interest is identified as not being present at the spot of the spot array (block 916) by, for example, the frequency spectrum comparator 214 associating the spot of the spot array with the absence of the substance(s) of interest. The program of FIG. 9 then determines whether or not to determine the frequency composition of another spot of the spot array (block 920) by, for example, the frequency spectrum comparator 214 determining if there is another spot of the spot array 114 that has not been analyzed and performing such an analysis if unanalyzed spots exist. Results are output (block 922) by, for example, the report generator 218 generating results relating to the presence or the absence of a substance(s) of interest at the different locations on the substrate.

The program of FIG. 10 describes an example calibration process that may be performed by the example light analyzer 132. The program of FIG. 10 begins by sensor input being accessed (block 1002) by, for example, the sensor interface 202 obtaining sensor data from the sensor 130. The light intensity measured by the sensor is determined (block 1004) by, for example, the spectrometer 206 determining an intensity of a spot of the reflected spot array 128. A reference light intensity is accessed (block 1006) by, for example, the intensity comparator 208 obtaining the reference light intensity value from the memory 210. The light intensity measured by the sensor is compared to the reference light intensity (block 1008) by, for example, the intensity comparator 208 comparing the light intensity measured by the sensor 130 to the reference light intensity to determine a difference. The program of FIG. 10 then determines if the measured light intensity is within a threshold of the reference light intensity (block 1010) by, for example, the frequency intensity comparator 208 comparing the determined difference to the threshold. If the measured light intensity is within a threshold of the reference light intensity, a lens is adjusted (block 1012) by, for example, the calibrator 212 obtaining the comparison data and/or the difference from the intensity comparator 208 and determining an amount that the actuator 126 should adjust the second lens 117, the beam splitter 108 and/or any other structure to enable the next measured light intensity value to match the reference light intensity value and/or to be within a threshold (e.g., between about 10 and 1000 photons per second) of the reference light intensity.

Figure 11:
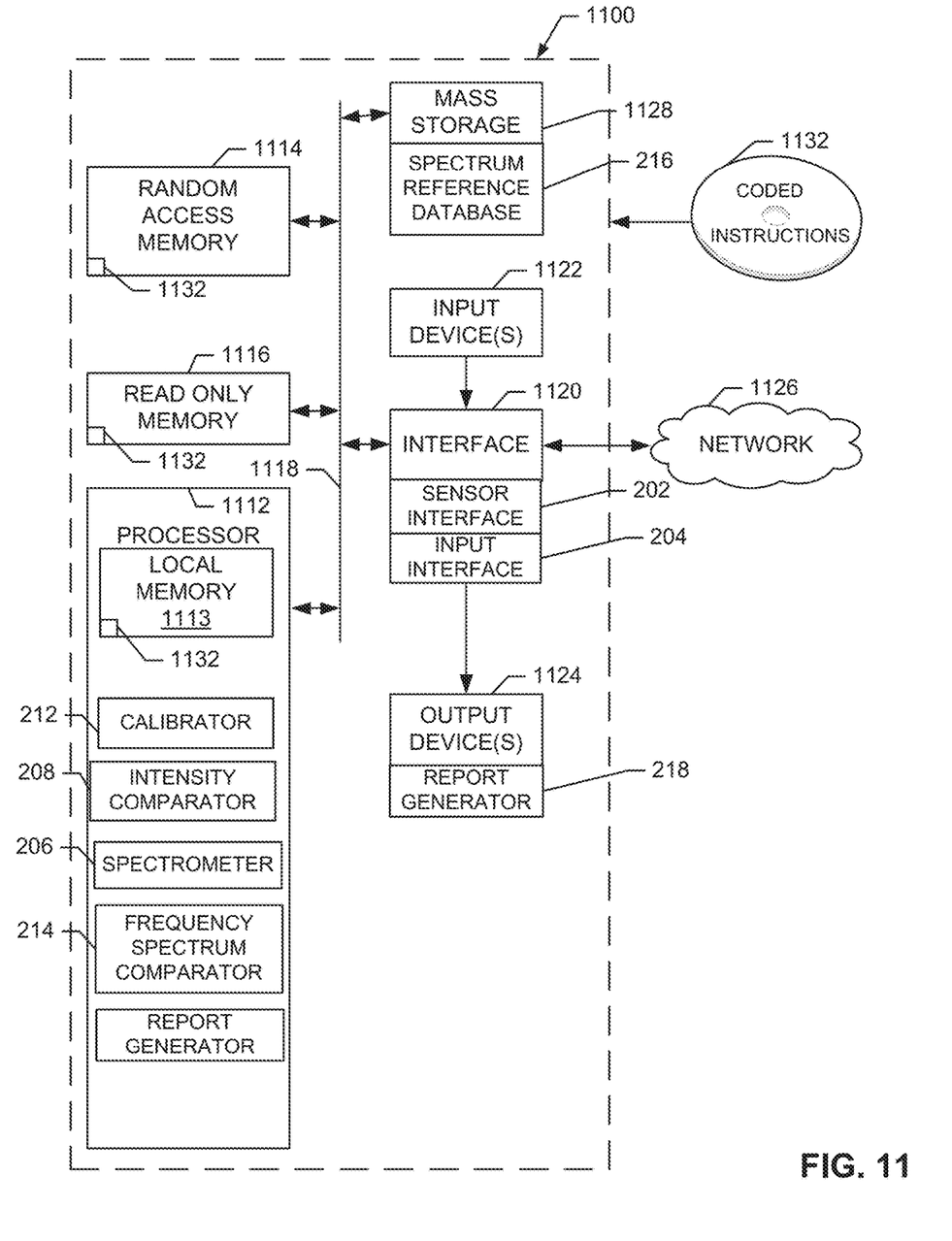
FIG. 11 is a block diagram of an example processor platform to execute the example instructions of FIGS. 9 and 10 to implement the optical reader of FIG. 1 and the example light analyzer of FIGS. 1 and/or 2.

FIG. 11 is a block diagram of an example processor platform 1100 capable of executing the instructions of FIGS. 9 and 10 to implement the example light analyzer 132 of FIG. 1. The processor platform 1100 can be, for example, a server, a personal computer, a mobile device (e.g., a cell phone, a smart phone, a tablet such as an iPad™), a personal digital assistant (PDA), an Internet appliance or any other type of computing device.

The processor platform 1100 of the illustrated example includes a processor 1112. The example processor 1110 includes the example calibrator 212, the example intensity comparator 208, the example spectrometer 206 and the example frequency spectrum comparator 214. The processor 1112 of the illustrated example is hardware. For example, the processor 1112 can be implemented by at least one of an integrated circuit, a logic circuit, a microprocessor or a controller from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The example interface circuit 1120 includes the sensor interface 202 and the input interface 204. The interface circuit 1120 may be implemented by any type of interface standard, such as an Ethernet interface, a universal serial bus (USB), and/or a PCI express interface.

In the illustrated example, at least one input device 1122 is connected to the interface circuit 1120. The input device (s) 1122 permit a user to enter data and commands into the processor 1112. The input device(s) can be implemented by, for example, an audio sensor, a microphone, a keyboard, a button, a mouse, a touchscreen, a track-pad, a trackball, isopoint and/or a voice recognition system.

At least one output device 1124 is also connected to the interface circuit 820 of the illustrated example. The output device 1124 includes the report generator 218. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer). The interface circuit 1120 of the illustrated example, thus, typically includes a graphics driver card.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes at least one mass storage device 1128 for storing software and/or data. The example mass storage device 11128 includes the spectrum reference database 216. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 9 and 10 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods, apparatus and articles of manufacture relate to spectrometers that use a holographic optical element to generate a light (e.g., laser) spot array from a light source (e.g., a single laser beam). In some examples, the light (e.g., laser) spot array is emitted onto a substrate having nanostructures arranged in similar patterns or arranged in different patterns (e.g., trimer patterns, dimer patterns, etc.).

Using the examples disclosed herein, multiple measurements at different locations on the substrate may be obtained with, for example, a single light source and/or a single sensor. In some examples, at least one of the locations on the substrate where an optical measurement is obtained is spaced from an axis on which two of the other locations on the substrate where optical measurements are obtained. In other words, in some examples, different locations on the substrate that are spaced from one another in two directions (e.g., an x-axis direction, a y-axis direction) may be measured substantially simultaneously. Thus, using the examples disclosed herein, a single data acquisition will deliver spectroscopic data relating to multiple locations on the substrate, thereby enabling results to be obtained relating to the presence or the absence of a substance(s) of interest without delay and without consuming resources used when performing multiple measurement operations.

In some examples, example substrates disclosed herein include nanostructure arrangements having nanostructures that are differently spaced relative to one another and/or include different numbers of nanostructures. In some examples, some of these nanostructure arrangements may be configured to detect a first substance of interest while others of the nanostructure arrangements may be configured to detect a second substance of interest. In some examples, to increase a probability of detecting the composition and/or the substance of interest, the spectroscopic data obtained from the different nanostructure arrangements may be compared to different data associated with the different substances of interest that may be present on the nanostructures.

In some examples, the example optical readers disclosed herein are relatively compact and/or portable and may be available at a reasonable price (e.g., lower cost) by, for example, reducing the number of moving parts of the example optical readers disclosed herein. In some examples, the spot array is a two-dimensional array having spots along a first axis (e.g., an x-axis) and spots along a second axis (e.g., a y-axis). Thus, the examples disclosed herein enable two-dimensional spectroscopic data to be obtained from a substrate.

An example optical reader including a light source to emit a light beam; and a spot pattern generator to receive the light beam and to generate a two-dimensional spot array from the light beam, the two-dimensional spot array to be directed toward a substrate having nanostructures, the two-dimensional spot array to be sensed to detect a presence or an absence of a substance of interest on the substrate. In some examples, the spot pattern generator is a holographic spot pattern generator. In some examples, the holographic spot pattern generator includes a superposition of diffraction gratings to generate the spot array. In some examples, the example optical reader includes a light analyzer to access measured spectroscopic data associated with respective spots of the two-dimensional spot array and to compare the measured spectroscopic data to reference spectroscopic data to detect the presence or the absence of the substance of interest.

In some examples, the substance of interest is a first substance of interest, the two-dimensional spot array to be directed toward the substrate having the nanostructures to enable a presence or an absence of a second substance of interest on the substrate to be detected. In some examples, the optical reader includes a light analyzer to access measured spectroscopic data associated with respective spots of the two-dimensional spot array and to compare the measured spectroscopic data to reference spectroscopic data to detect the presence or the absence of one of the first substance of interest and the second substance of interest. In some examples, the optical reader includes a diffraction grating to receive a reflected light array from the substrate, an angle of the reflected light array relative to the diffraction grating being approximately fifteen degrees to enable bands of light received at a sensor and associated with the reflected light array to have a threshold spacing. In some examples, the optical reader includes an actuator to adjust a position of a lens relative to the substrate to enable the two-dimensional spot array to have a threshold intensity.

In some examples, the optical reader includes a light analyzer to access a measured light intensity value of the two-dimensional spot array and to compare the measured light intensity value to a reference light intensity value to determine if the measured light intensity value is within a threshold of the reference light intensity value. In some examples, the light analyzer is to cause an actuator to adjust a position of a lens relative to the substrate to enable a subsequently measured light intensity value to be within a threshold of the reference light intensity value.

An example, method includes generating a two-dimensional spot array from a light beam; directing the two-dimensional spot array toward a substrate having nanostructures; and determining a presence or an absence of a substance of interest on the substrate based on spectroscopic data associated with spots of the two-dimensional spot array. In some examples, the determining of the presence or the absence of the substance of interest on the substrate includes comparing the spectroscopic data associated with a first location on the substrate to reference spectroscopic data to determine the presence or the absence of the substance of interest at the first location, comparing the spectroscopic data associated with a second location on the substrate to reference spectroscopic data to determine the presence or the absence of the substance of interest at the second location, and comparing the spectroscopic data associated with a third location on the substrate to reference spectroscopic data to determine the presence or the absence of the substance of interest at the third location, one of the first location, the second location, and the third location being axially offset from others of the first location, the second location, and the third location. In some examples, the method includes adjusting a lens to enable an intensity of light received and associated with the spectroscopic data to be within a threshold of a reference light intensity.

An example optical reader includes a light source to emit a light beam; and means of converting the light beam into a two-dimensional spot array, the two-dimensional spot array to be directed toward a substrate having nanostructures to enable a presence or an absence of a substance of interest on the substrate to be detected. The example optical reader includes a light analyzer to access measured spectroscopic data associated with respective spots of the two-dimensional spot array and to compare the measured spectroscopic data to reference spectroscopic data to detect the presence or the absence of one of the first substance of interest and the second substance of interest.

An example optical reader includes a light source to emit a light beam; a diffractive amplitude mask to convert the light beam into a two-dimensional spot array, the two-dimensional spot array to be directed toward a substrate having nanostructures; and a sensor to measure spectroscopic data associated with reflected spots of the two-dimensional spot array to enable the detection of a presence or an absence of a substance of interest on the substrate.

In some examples, the optical reader includes a light analyzer to access the measured spectroscopic data associated with the reflected spots of the two-dimensional spot array and to compare the measured spectroscopic data to reference spectroscopic data to detect the presence or the absence of one of the substance of interest.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An optical reader comprising:
   a spot pattern generator to:
      receive a light beam from a light source, and
      generate a two-dimensional spot array from the light beam, the two-dimensional spot array to be directed toward a substrate having nanostructures;
   an actuator to adjust a position of a lens relative to the substrate to change an intensity of the two-dimensional spot array; and
   a light analyzer to:
      access measured spectroscopic data associated with the two-dimensional spot array on the substrate,
      perform a first comparison of the measured spectroscopic data associated with a first location on the substrate to reference spectroscopic data,
      perform a second comparison of the measured spectroscopic data associated with a second location on the substrate to the reference spectroscopic data,
      determine the presence or the absence of a substance of interest based on the first comparison and the second comparison,
      perform a third comparison of the intensity of the two-dimensional spot array to a threshold intensity,
      activate the actuator based on the third comparison, and
      utilize a feedback loop to at least one of change or maintain the intensity of the two-dimensional spot array.

2. The optical reader of claim 1, wherein the spot pattern generator is a holographic spot pattern generator.

3. The optical reader of claim 1, wherein the substance of interest is a first substance of interest, the light analyzer to determine a presence or an absence of a second substance of interest on the substrate based on the measured spectroscopic data.

4. The optical reader of claim 3, wherein the light analyzer is to determine the presence or the absence of the first substance of interest and the presence or absence of the second substance of interest substantially simultaneously.

5. The optical reader of claim 1, further including a diffraction grating to receive a reflected light array from the substrate, an angle of the reflected light array relative to the diffraction grating being approximately fifteen degrees.

6. The optical reader of claim 1, wherein the nanostructures include pillars.

7. The optical reader of claim 1, wherein the nanostructures have changeable geometries.

8. The optical reader of claim 1, further including the light source to emit the light beam.

9. An optical reader of claim 3, comprising:
   a spot pattern generator to:
      receive a light beam from a light source, and
      generate a two-dimensional spot array from the light beam, the two-dimensional spot array to be directed toward a substrate having nanostructures the substrate including a first topography and a second topography, the second topography different from the first topography; and a light analyzer to:
  access measured spectroscopic data associated with the two-dimensional spot array on the substrate,
  perform a first comparison of the measured spectroscopic data associated with a first location on the substrate to reference spectroscopic data,
  perform a second comparison of the measured spectroscopic data associated with a second location on the substrate to the reference spectroscopic data,
  determine the presence or the absence of a first substance of interest on the substrate based on the first comparison and the second comparison, and
  determine a presence or an absence of a second substance of interest on the substrate based on the measured spectroscopic data.

10. The optical read of claim 9, wherein the light analyzer is to analyze the first topography to detect the presence of absence of the first substance of interest, and the light analyzer is to analyze the second topography to detected the presence or absence of the second substance of interest.

11. A method comprising:
  generating a two-dimensional spot array from a light beam;
  directing the two-dimensional spot array toward a substrate having nanostructures;
  performing a first comparison of spectroscopic data associated with a first location on the substrate to reference spectroscopic data;
  performing a second comparison of spectroscopic data associated with a second location on the substrate to the reference spectroscopic data;
  determining the presence or the absence of a substance of interest based on the first comparison and the second comparison;
  performing a third comparison of an intensity of the two-dimensional spot array to a threshold intensity;
  adjusting a position of a lens based on the third comparison; and
  utilizing a feedback loop to at least one of change or maintain the intensity of the two-dimensional spot array.

12. The method of claim 11, wherein the substance of interest is a first substance of interest, and further including determining a presence or an absence of a second substance of interest on the substrate based on the spectroscopic data substantially simultaneously as determining the presence or the absence of the first substance of interest.

13. An optical reader comprising:
  holographic spot pattern generator to convert a light beam into a spot array;
  a sensor to output spectroscopic data associated with spots of the spot array reflected from nanostructures of a substrate;
  an actuator to adjust a position of a lens relative to the substrate to change an intensity of the spot array; and
  an analyzer to:
    perform a first comparison of the spectroscopic data associated with a first nanostructure on the substrate to reference spectroscopic data,
    perform a second comparison of the spectroscopic data associated with a second nanostructure on the substrate to the reference spectroscopic data, and
    determine the presence or the absence of a substance of interest based on the first comparison and the second comparison;
    perform a third comparison of the intensity of the spot array to a threshold intensity;
    activate the actuator based on the third comparison; and
    utilize a feedback loop to at least one of change or maintain the intensity of the spot array.

14. The optical reader of claim 13, wherein the holographic spot pattern generator includes a superposition of diffraction gratings to generate the spot array.

15. The optical reader of claim 14, wherein the superposition of diffraction gratings includes different spatial frequencies to convert the light beam into a superposition of multiple light beams.

16. The optical reader of claim 13, wherein the holographic spot pattern generator includes a first grating pattern having a first periodicity and a second grating pattern having a second periodicity, the first periodicity to focus the light beam at a first location, and the second periodicity to focus the light beam at a second location.

17. The optical reader of claim 16, wherein the first grating pattern is orthogonal to the second grating pattern.

* * * * *